United States Patent [19]

Smutny et al.

[11] Patent Number: 5,115,009
[45] Date of Patent: May 19, 1992

[54] POLYKETONE POLYMER COMPOSITIONS CONTAINING A POLAR ESTER OR AMINE LUBRICATING COMPOUND

[75] Inventors: Edgar J. Smutny; William P. Gergen, both of Houston, Tex.; Antonius A. Broekhuis, Amsterdam, Netherlands; Franciscus C. Groenland, Amsterdam, Netherlands; Johan M. Beijen, Amsterdam, Netherlands

[73] Assignee: Shell Oil Company, Houston, Tex.

[21] Appl. No.: 671,232

[22] Filed: Mar. 19, 1991

[30] Foreign Application Priority Data

Apr. 3, 1990 [GB] United Kingdom ............... 9007432

[51] Int. Cl.$^5$ .................. C08K 5/10; C08K 5/17
[52] U.S. Cl. .................. 524/306; 524/197; 524/210; 524/233; 524/312
[58] Field of Search ............... 524/312, 306, 210, 233, 524/197

[56] References Cited

U.S. PATENT DOCUMENTS

| | | | |
|---|---|---|---|
| 3,694,412 | 9/1972 | Nozaki | 260/63 |
| 3,864,295 | 2/1975 | Boussely | 524/312 |
| 4,481,324 | 11/1984 | Hall et al. | 524/312 |
| 4,857,570 | 8/1989 | Smutny | 524/112 |
| 4,880,903 | 11/1989 | Broekhoven et al. | 528/392 |
| 4,948,865 | 8/1990 | Drent | 528/271 |
| 4,994,513 | 2/1991 | Syrier et al. | 524/210 |

FOREIGN PATENT DOCUMENTS

| | | |
|---|---|---|
| 0897857 | 4/1972 | Canada . |
| 121965 | 10/1984 | European Pat. Off. . |
| 181014 | 5/1986 | European Pat. Off. . |
| 213671 | 3/1987 | European Pat. Off. . |
| 257663 | 3/1988 | European Pat. Off. . |
| 326224 | 8/1989 | European Pat. Off. . |
| 0852487 | 10/1960 | United Kingdom . |

OTHER PUBLICATIONS

"N,N-Dialkylamides of Long Chain Fatty Acids as Plasticizers", Mod et al., J.A. Oil Chemists' Society, Nov. 1965, vol. 42, No. 11.

Primary Examiner—Paul R. Michl
Assistant Examiner—Tae H. Yoon
Attorney, Agent, or Firm—James O. Okorafor

[57] ABSTRACT

Compositions comprising linear alternating polymers of carbon monoxide and at least one ethylenically unsaturated hydrocarbon and certain polar additives containing at least two groups of substantial carbon number show improved processing properties. A method of improving the processing properties of the linear alternating polymer comprises incorporating therein at least one of the polar additives.

20 Claims, No Drawings

POLYKETONE POLYMER COMPOSITIONS CONTAINING A POLAR ESTER OR AMINE LUBRICATING COMPOUND

FIELD OF THE INVENTION

This invention relates to polymer compositions comprising a linear alternating polymer of carbon monoxide and at least one ethylenically unsaturated hydrocarbon. More particularly, the invention relates to compositions comprising a major proportion of such linear alternating polymer and a minor amount of one or more additives, the composition having improved processing properties.

BACKGROUND OF THE INVENTION

The class of linear alternating polymers of carbon monoxide and at least one ethylenically unsaturated hydrocarbon has been known for some time. These polymers were produced by Nozaki, e.g., U.S. Pat. No. 3,694,412, employing as catalyst arylphosphine complexes of palladium moieties and certain inert solvents. More recent methods for the production of such polymers, now known as polyketones or polyketone polymers, are illustrated by a number of published European Patent Applications including Nos. 121,965, 181,014, 213,671 and 257,663. These processes involve the use of catalyst compositions produced from a compound of palladium, nickel, or cobalt, an anion of a strong non-hydrohalogenic acid and a bidentate ligand of phosphorus, arsenic, antimony or nitrogen.

The resulting polymers are relatively high molecular weight materials having established utility as premium thermoplastics. For example, the polyketone polymers are processed by techniques conventional for thermoplastics into a variety of shaped articles including containers for food and drink. Although the polymers have many attractive properties such as yield stress, tensile strength, impact strength and flex modulus, the processing of the polymers is often more difficult than desired, particularly if the polyketone polymer has a relatively high molecular weight, as reflected in a relatively high limiting viscosity number, LVN, as measured in m-cresol at 60° C. Yet, the polymers of relatively high LVN are more attractive as engineering thermoplastics.

In published European Patent Application 326,224 the use of fatty acid amides as lubricating additives for polyketone polymers is disclosed. In U.S. Pat. No. 4,857,570 the use of carboxylic acids having from 1 to 2 alkyl side chains as melt stabilizers for polyketone polymers is disclosed. In copending U.S. patent application Ser. No. 674,991, filed Mar. 26, 1991, the use of certain polar materials of a wide variety of structures as lubricating additives for polyketone polymers is disclosed. It would be of advantage, however, to provide polyketone compositions containing polar additives of improved processing properties.

SUMMARY OF THE INVENTION

The present invention provides compositions comprising linear alternating polymer of carbon monoxide and at least one ethylenically unsaturated hydrocarbon having improved processing properties. More particularly, the invention provides such compositions comprising a major proportion of the linear alternating polymer and a minor proportion of one or more certain lubricating additives having at least two hydrocarbyl groups of substantial carbon number. The invention also relates to a method of improving the processing properties of the linear alternating polymer by the incorporation therein of a minor proportion of one or more of the lubricating additives.

DESCRIPTION OF THE INVENTION

The present invention relates to compositions of improved processing properties which comprise a major proportion of a linear alternating polymer of carbon monoxide and at least one ethylenically unsaturated hydrocarbon. The ethylenically unsaturated hydrocarbons useful as precursors of the linear alternating polymer have up to 20 carbon atoms inclusive, preferably up to 10 carbon atoms inclusive, and are aliphatic including ethylene and other α-olefins such as propylene, butylene, isobutylene, 1-hexene, 1-octene and 1-dodecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred copolymers employed in the compositions of the invention are copolymers of carbon monoxide and ethylene and the preferred terpolymers are terpolymers of carbon monoxide, ethylene and a second ethylenically unsaturated hydrocarbon of at least 3 carbon atoms, particularly an α-olefin such as propylene.

When the preferred terpolymers are employed, there will be at least two units incorporating a moiety of ethylene for each unit incorporating a moiety of the second ethylenically unsaturated hydrocarbon. Preferably, there will be from about 10 to about 100 units incorporating a moiety of ethylene for each unit incorporating a moiety of the second hydrocarbon. The polymeric chain of the preferred polyketone polymers is therefore represented by the repeating formula

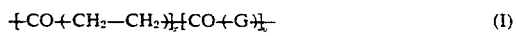  (I)

wherein G is the moiety of the second ethylenically unsaturated hydrocarbon of at least 3 carbon atoms polymerized through the ethylenic unsaturation thereof and the ratio of y:x is no more than about 0.5. When the preferred copolymers are employed in the compositions of the invention there will be no second hydrocarbon present and the copolymers are represented by the above formula I wherein y is zero. When y is other than zero, i.e., terpolymers are employed, the —CO+(CH₂CH₂)— units and the —CO+(G)— units are found randomly throughout the polymer chain and the preferred ratios of y:x are from about 0.01 to abot 0.1. The end groups or "caps" of the polymer chain will depend upon what materials were present during polymerization and what and whether the polymer has been purified. The precise nature of the end groups is of little significance so far as the overall properties of the polymer are concerned so that the polyketone polymers are fairly represented by the formula for the polymeric chain as depicted above.

Of particular interest are the linear alternating polymers of number average molecular weight from about 1,000 to 200,000, particularly those polymers of number average molecular weight from about 20,000 to about 90,000, as determined by gel permeation chromatography. The physical properties of the polymers will be determined in part by the molecular weight, whether the polymer is a copolymer or a terpolymer and, in the case of terpolymers, the nature of and the proportion of the second hydrocarbon present. Typical melting points for such polymers are from about 175° C. to about 300° C. but more often are from about 210° C. to about 270° C. Such polymers will typically have limiting viscosity numbers (LVN), as measured in a standard capillary viscosity measuring device in m-cresol at 60° C., of from about 0.4 dl/g to about 10 dl/g, preferably from about 0.8 dl/g to about 4 dl/g. The compositions of the invention are particularly usefully produced from polyketone polymers of LVN from about 1.5 dl/g to about 4 dl/g.

The polyketone polymers are produced by the general processes illustrated by the above published European Patent Applications. Although the scope of the polymerization process is extensive, a preferred catalyst composition is formed from a compound of palladium, particularly palladium acetate, the anion of a non-hydrohalogenic acid having a pKa below 2, e.g., trifluoroacetic acid or p-toluenesulfonic acid, and a bidentate ligand of phosphorus such as 1,3-bis(diphenylphosphino)propane or 1,3-bis[di(2-methoxyphenyl)phosphino]propane. The polymerization process is conducted by contacting the monomers under polymerization conditions in the presence of the catalyst composition and a polar reaction diluent such as methanol. Typical polymerization conditions will include a polymerization temperature from about 20° C. to about 150° C. but preferably from about 30° C. to about 135° C. The suitable reaction pressures will be from about 5 bar to about 200 bar but pressures from about 10 bar to about 100 bar are more often employed. Reactant and catalyst contacting during polymerization is facilitated by some means of agitation, e.g., shaking or stirring, and subsequent to reaction the polymerization is terminated by cooling the reactor and contents and releasing the pressure. The polymer product is customarily obtained as a material substantially insoluble in the reaction diluent and is recovered by conventional techniques such as filtration or decantation. The polymer is used as such or is purified as by contacting the polymer with a solvent or complexing agent selective for catalyst residues.

The compositions of the invention comprise a major proportion of the linear alternating polymer and a minor proportion of at least one polar compound lubricating additive containing at least two hydrocarbyl groups of substantial carbon number, i.e., at least two hydrocarbyl groups of from 5 to 30 carbon atoms, attached to polar moieties of the compound. Such polar lubricating additives are represented by the formula Y(ZR)$_n$  (II)

wherein Y is a n-valent alkyl, including cycloalkyl, group of up to 6 carbon atoms substituted with up to 2 polar groups selected from —OR', —CO$_2$R' and —O—COR', wherein R' independently is hydrogen or alkyl of up to 4 carbon atoms inclusive, Z independently is selected from —O—, —CO—O—, —CONR'— or R'—CO—N< wherein R' has the previously stated meaning, n is 2 or 3 and R independently is a hydrocarbyl group of from 5 to 30 carbon atoms inclusive attached to Y through a polar group Z. Each R group is aliphatic or aromatic or contains moieties of both and more suitably has from 10 to 30 carbon atoms. Illustrative of aromatic R groups are those derived from benzene or naphthalene and cycloaliphatic R groups are illustrated by those derived from cyclohexane, cycloheptane and norbornane. Preferred R groups are aliphatic and particularly preferred are primary, straight-chain alkyl groups such as those found in myristic acid, stearic acid, palmitic acid and montanic acid.

Illustrative of the lubricating additives of the invention are esters such as trimyristyl 1,3,5-cyclohexanetricarboxylate, bis(4,6,8-trimethylnon-2-yl) suberate, 1,3-(2,2-dimethylpropyl) dilaurate, 1-montanoxyloxy-1,3-didecanoyloxypropane and dibornyl 2-methoxy-1,3-propandioate. Preferred among such ester additives are di- and tri-esters of glycol such as glycerol 1,2-dioleate, glycerol 1,2-dioctanoate, glycerol 1,3-disterate, glycerol 1,2-dioleate 3-stearate, glycerol tripalmate and glycerol tristearate.

Illustrative of lubricating additives containing amide linkages are N,N'-dimethyl-N,N'-dimyristoyltrimethylenediamine, N,N'-distearoylmethylenediamine, N-docosyl-2-(4'-hexylbenzoylamino)propionamide, N,N'-dilinoleylsuccinamide, N,N'-didocosanoylethylenediamine, N,N-dilaurylethylenediamine and N,N'-distearoylethylenediamine. Preferred among the amide lubricating additives are diamides of ethylenediamine wherein the acid moiety is R.

The lubricating additive is employed in a minor proportion in the compositions of the invention. Suitable amounts of lubricating additive are from about 0.01% by weight to about 5% by weight based on total composition. Preferred quantities of lubricating additive are from about 0.1% by weight to about 3% by weight on the same basis. The polyketone polymer and the lubricating additive are combined by procedures conventional for producing such compositions including dry blending and extruding. The compositions may suitably contain other additives which are conventionally employed to provide thermal or UV stabilization including hindered phenols and aromatic amines. Such additives are introduced into the composition prior to, together with or subsequent to the mixing of the polyketone polymer and the lubricating additive.

The compositions of the invention demonstrate improved processing properties as compared with other additives including similar polar compounds having only a single hydrocarbyl group of substantial carbon number. The compositions are processed as in an extruder using less torque for a given feed rate or alternatively the use of a higher feed rate is possible at constant torque. The compositions showed lower increases in viscosity when processed by methods which apply mechanical stress. The compositions are thermoplastic as previously stated and are processed by such techniques conventional for thermoplastics. Specific applications are in the production of containers for food and drink and parts and housings for automotive applications.

The invention is further illustrated by the following Comparative Examples (not of the invention) and the Illustrative Embodiments which should not be regarded as limiting.

ILLUSTRATIVE EMBODIMENT (IE) I

Comparative Examples (CE) I and II

A granular linear alternating polymer of carbon monoxide, ethylene and propylene having a linear viscosity number of 1.36 dl/g (measured in m-cresol at 60° C.) and a melting point of 222° C. contained 0.5% by weight of n-octadecyl 3-(3,5-di-t-butyl-4-hydroxyphenyl)propionate and 0.5% by weight of 2,6-di-t- butyl-4-methylphenol (commercially available antioxidants). Sample of the terpolymer were mixed with various additives by dry blending and tumbling in air for 85 minutes. Samples of the blends were transferred to a commercial torque rheometer designed for operation with polyvinyl chloride and equipped with two spindles. The rheometer was operated at 240° C. The torque of each blend was measured at speeds of 60 rpm of one spindle and 40 rpm of the other spindle. The results are shown in Table I.

TABLE I

| Additive % wt. | Initial Torque. Nm | Rate of Increase of Torque, Nm/min |
| --- | --- | --- |
| IE I N,N'-distearoylethylenediamine, 1.0 | 3.6 | 0.06 |
| CE I | 4.7 | 5.1 |
| None | 4.5 | 5.3 |
| CE II | 2.2 | 0.13 |
| Stearamide, 1.0 | 2.8 | 0.10 |

ILLUSTRATIVE EMBODIMENTS II AND III

Comparative Examples III and IV

A linear alternating terpolymer of carbon monoxide, ethylene and propylene had a limiting viscosity number of 1.84 dl/g (measured in m-cresol at 60° C.) and a melting point of 218° C. This polymer, in powdered form, was mixed with samples of various additives by dry blending and tumbling in air for 5 minutes. Samples of each mixture were then extruded in air in a 15 mm twin-screw extruder operated at 275° C. The relative feed rates were calculated while maintaining a constant torque of 300 rpm. Plaques of each material of 0.75 mm thickness were compression molded by pressing the extrudates at 240° C. for 1.5 minutes. The plaques were used in dynamic viscosity measurements over 30 minutes residence time at 275° C. and 1 rad/s using a parallel plate rheometer. The results of these tests are shown in Table II.

TABLE II

| Additive, % wt. | Relative Feed Rate | Initial Viscosity, $10^3$ Pa·s | Rate of Viscosity Increase Pa·s/min |
| --- | --- | --- | --- |
| IE II Glycerol 1,3-distearate, 0.3 | 1.6 | 1.7 | 570 |
| IE III Glycerol tristearate, 0.3 | 1.9 | 1.7 | 540 |
| CE III None | 1.0 (defined) | 2.5 | 1000 |
| CE IV Glycerol 1-monostearate, 0.3 | 1.5 | 2.0 | 710 |

What is claimed is:

1. A polymer composition comprising a major proportion of a linear alternating polymer of carbon monoxide and at least one ethylenically unsaturated hydrocarbon and a minor proportion of at least one polar ester or amine compound lubricating additive having at least two hydrocarbyl substituents of substantial carbon number attached to polar moieties of the polar compound.

2. The composition of claim 1 wherein the polymer is represented by the repeating formula

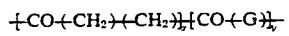

wherein G is the moiety of an ethylenically unsaturated hydrocarbon of at least 3 carbon atoms polymerized through the ethylenic unsaturation thereof and the ratio of y:x is no more than about 0.5.

3. The composition of claim 2 wherein the polar compound is represented by the formula $$Y(ZR)_n$$

wherein Y is a n-valent alkyl group of up to 6 carbon atoms inclusive substituted with up to 2 polar groups selected from —OR', —CO₂R' or —OCOR', wherein R' independently is hydrogen or alkyl of up to 4 carbon atoms inclusive, Z independently is selected from —O—, —CO—O—, —CONR'— or R'—CON< wherein R' independently is hydrogen or alkyl of up to 4 carbon atoms, n is 2 or 3 and R independently is a hydrocarbyl group of from 5 to 30 carbon atoms inclusive.

4. The composition of claim 3 wherein the quantity of polar compound is from about 0.01% by weight to about 5% by weight based on total composition.

5. The composition of claim 4 wherein y is zero.

6. The composition of claim 4 wherein G is a moiety of propylene and the ratio of y:x is from about 0.01 to about 0.1.

7. The composition of claim 1 wherein the polar ester compound is a di- or tri-ester of glycerol.

8. The composition of claim 7 wherein the ester is glycerol 1,3-distearate.

9. The composition of claim 7 wherein the ester is glycerol tristearate.

10. The composition of claim 1 wherein the polar amine compound is a diamide of ethylenediamine.

11. The composition of claim 1 wherein the polar amine compound is N,N'-distearoylethylenediamine.

12. A method of providing improved processing properties to linear alternating polymer of carbon monoxide and at least one ethylenically unsaturated hydrocarbon by incorporating therein a minor proportion of at least one polar ester or amine compound lubricating additive having at least two hydrocarbyl substituents of substantial carbon number attached to polar moieties of the polar compound.

13. The method of claim 12 wherein the polymer is represented by the repeating formula

wherein G is the moiety of an ethylenically unsaturated hydrocarbon of at least 3 carbon atoms polymerized through the ethylenic unsaturation thereof and the ratio of y:x is no more than about 0.5.

14. The method of claim 13 wherein the polar compound is represented by the formula $$Y(ZR)_n$$

wherein Y is a n-valent alkyl group of up to 6 carbon atoms substituted with up to 2 polar groups selected from —OR', —CO₂R' or —OCOR', wherein R' independently is hydrogen or alkyl of up to 4 carbon atoms inclusive, Z independently is selected from —O—, —CO—O—, —CONR'— or R'—CON< wherein R' independently is hydrogen or alkyl of up to 4 carbon atoms inclusive, n is 2 or 3 and R independently is a hydrocarbyl group of from 5 to 30 carbon atoms inclusive.

15. The method of claim 14 wherein the quantity of polar compound incorporated is from about 0.01% by weight to about 5% by weight based on total composition.

16. The method of claim 15 wherein the polar amine compound is a diamide of ethylenediamine.

17. The method of claim 16 wherein the diamide is N,N'-distearoylethylenediamine.

18. The method of claim 12 wherein the polar ester compound is a di- to tri-ester of glycerol.

19. The method of claim 18 wherein the ester is glycerol 1,3-distearate.

20. The method of claim 18 wherein the ester is glycerol tristearate.

* * * * *